3,637,687
POLYSUBSTITUTED AS-TRIAZINO[5,6-b]INDOLES
Alfred W. Chow, Radnor, Pa., assignor to Smith Kline & French Laboratories
No Drawing. Filed Apr. 21, 1970, Ser. No. 30,576
Int. Cl. C07d 57/34
U.S. Cl. 260—249.9        10 Claims

ABSTRACT OF THE DISCLOSURE

The compounds are as-triazino[5,6-b]indoles polysubstituted on the benzene ring substituted on the triazine ring at the 3-position with a hydroxyalkylamino group which have antiviral activity.

---

This invention relates to new as-triazino[5,6-b]indoles having antiviral activity. These as-triazino[5,6-b]indoles are polysubstituted on the benzene ring and substituted on the triazine ring at the 3-position with a hydroxyalkylamino group.

The compounds of this invention are represented by the following structural formula:

FORMULA I

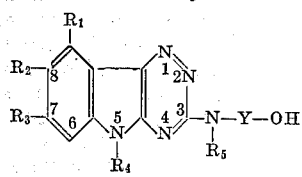

in which:

$R_1$, $R_2$ and $R_3$ are hydrogen, halogen, lower alkyl, lower alkoxy, hydroxy, nitro, amino, lower alkylamino, di-lower alkylamino, lower alkanoylamino, trifluoromethyl, lower alkylthio, mercapto, lower alkylsulfonyl, lower alkanoyl, cyano, carboxy, lower alkoxycarbonyl, carbamoyl or amidino or, when $R_1$ is hydrogen, $R_2$ and $R_3$ taken together may be methylenedioxy, at least two of $R_1$, $R_2$ and $R_3$ being other than hydrogen;
$R_4$ is hydrogen, lower alkyl, benzyl or phenethyl;
$R_5$ is hydrogen or methyl and
Y is branched or straight chain alkylene of 2–10 carbon atoms, or a pharmaceutically acceptable, acid addition salt thereof, said lower alkyl, lower alkoxy and lower alkanoyl groups having 1–4 carbon atoms.

An inert substituent, such as halogen or lower alkyl, may be present in the 6-position of compounds which have the basic structure of Formula I to produce compounds also having antitriviral activity.

Preferred compounds of this invention are represented by Formula I in which:

$R_1$ and $R_3$ are hydrogen, halogen, methyl, ethyl, methoxy, ethoxy or hydroxy, at least one of $R_1$ and $R_3$ being other than hydrogen;
$R_2$ is lower alkyl, lower alkoxy, hydroxy, amino, lower alkylamino or di-lower alkylamino;
$R_4$ is methyl or ethyl, preferably methyl;
$R_5$ is hydrogen and
Y is

The pharmaceutically acceptable, acid addition salts of the compounds of Formula I which are included in this invention are, for example, hydrochloride, sulfate, nitrate, citrate, maleate, fumarate, acetate and benzoate salts.

The compounds of Formula I are prepared by reacting an isatin which thiosemicarbazide, cyclizing the resulting isatin β-thiosemicarbazone and converting the resulting 3 - mercapto - as - triazino[5,6 - b]indole by conventional methods to compounds of Formula I.

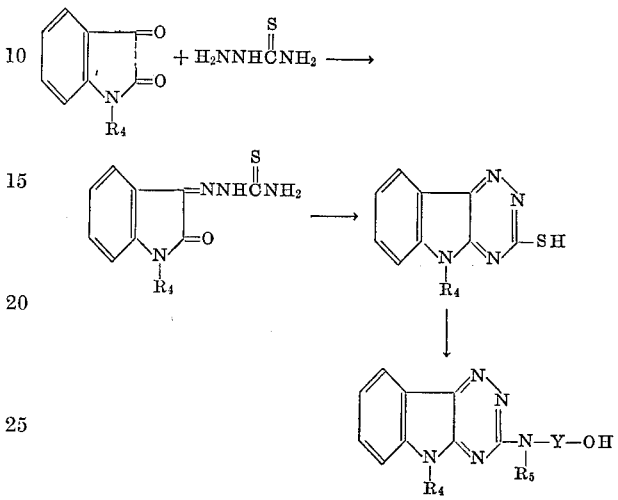

The isatin is reacted with thiosemicarbazide preferably in aqueous potassium carbonate solution at reflux temperature to give the corresponding isatin β-thiosemicarbazone.

The isatin β-thiosemicarbazones are cyclized by, for example, refluxing in the presence of aqueous potassium carbonate solution. Alternatively, an isatin and thiosemicarbazide may be refluxed together in aqueous potassium carbonate solution to give a 3-mercapto-as-triazino[5,6-b]indole without isolating the isatin β-thiosemicarbazone.

The 3-mercapto-as-triazino[5,6-b]indoles are reacted with an aminoalkanol, preferably by refluxing in an inert solvent such as butanol or in an excess of the aminoalkanol. Alternatively, if the aminoalkanol is a low boiling compound, an alcoholic solution of it may be heated in a sealed tube with the 3-mercapto-as-triazino [5,6-b]indoles.

The products may also be prepared by converting the 3-mercapto-as-triazino[5,6-b]indole intermediates to the corresponding 3-methylthio compounds by methylating by conventional methods and optionally oxidizing, for example using potassium permanganate, to give the corresponding 3-methylsulfonyl compounds and then treating the 3-methylthio or 3-methylsulfonyl compounds with an aminoalkanol.

Also, the products may be prepared by converting the 3-mercapto-as-triazino[5,6-b]indole intermediates to the corresponding 3-hydroxy compounds with, for example, hydrogen peroxide in alkaline solution, for example, aqueous sodium hydroxide solution, then converting the 3-hydroxy-as-triazino[5,6-b]indoles to the corresponding 3-chloro-as-triazino[5,6-b]indoles using a chlorinating agent such as phosphorus oxychloride and then reacting with an aminoalkanol to give compounds of Formula I.

Compounds of Formula I in which $R_1$, $R_2$ and $R_3$ are hydrogen, malogen, lower alkyl, lower alkoxy, nitro, trifluoromethyl, lower alkylthio, lower alkylsufony, lower alkanoyl, carboxy or lower alkoxycarbonyl, or $R_2$ and $R_3$ taken together are methylenedioxy, and $R_4$ is as defined above are prepared by using as a starting material an isatin compound having the corresponding $R_1$, $R_2$, $R_3$ and $R_4$ substituents.

Compounds of Formula I in which any of the $R_1$ to $R_3$ substituents are hydroxy or mercapto are prepared using lower alkoxy or lower alkylthio substituted isatin starting materials and cleaving the corresponding lower alkoxy or lower alkylthio groups of the 3-mercapto-as-triazino [5,6-b]indole intermediates with 48% hydrobromic acid and converting the resulting hydroxy or mercapto substituted intermediates to the corresponding compounds of Formula I.

Compounds of Formula I in which any of $R_1$ to $R_3$ are amino are prepared by reducing the corresponding nitro compounds or by reacting the corresponding bromo compounds with ammonia. Compounds in which any of $R_1$ to $R_3$ are lower alkylamino or di-lower alkylamino are prepared by reacting the corresponding bromo compounds with a lower alkylamine or a di-lower alkylamine. Compounds in which any of $R_1$ to $R_3$ are lower alkanoylamino are prepared by reacting the corresponding amino compounds with, for example, a lower alkanoyl halide, lower alkanoic acid anhydride or, to prepare the N-formyl compound, ethyl formate. These compounds may also be prepared by reducing the nitro triazino[5,6-b]indole intermediates to give the amino substituted intermediates or reacting the bromo triazine[5,6-b]indole intermediates with ammonia or a substituted amine to give the amino or substituted amino intermediates and then reacting the resulting intermediates as described above to give amino and substituted amino compounds of Formula I.

Compounds of Formula I in which any of $R_1$ to $R_3$ are cyano are prepared by reacting the corresponding bromo compounds or bromo substituted 3-mercapto-as-triazino [5,6-b]indole intermediates with cuprous cyanide and when the cyano intermediates are prepared, optionally methylating to give the 3-methylthio compound and reacting the cyano substituted 3-mercapto or 3-methylthio-triazino[5,6-b]indole with an aminoalkanol. The corresponding carbamoyl substituted intermediates are prepared by treating the cyano substituted intermediates with hydrochloric acid.

The amidino substituted compounds of Formula I are prepared by treating the corresponding cyano substituted compounds with hydrogen chloride and ethanol and then treating the resulting ethoxyformimidoyl compounds with ammonia in alcohol solution.

Salts of the compounds of Formula I are prepared by reacting the compounds with inorganic or organic acids.

The compounds of this invention have antiviral activity, in particular activity against vaccinia and rhinoviruses. These compounds have been found to have favorable therapeutic ratios against rhinovirus as indicated in standard tests, for example the plaque inhibition test and the tube dilution test (Methods in Drug Evaluation, Mantegazza et al., ed., 375–378, North-Holland Publishing Co., 1966). In particular, the following compounds have shown activity against rhinovirus strains such as 2060, HGP, 1059 and 33342 in the plaque inhibition test:

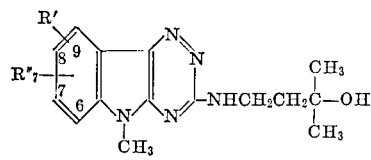

in which R' and R" are:

7,9-di-$CH_3$
7,8-di-$OCH_3$
7-Cl, 8-$OCH_3$
7-$CH_3$, 8-$NH_2$
8-$NH_2$, 9-$CH_3$

8-$NH_2$, 9-Cl
7-Cl, 8-$NH_2$
7,8-methylenedioxy
7-$OCH_3$, 8-$NH_2$
8-OH, 9-Br

The compounds of this invention are advantageous in that they produce increased antiviral activity and/or an improved metabolic pattern. Metabolism of the triazino-indoles tends to occur at the 8-position to produce compounds which may be less active, subject to conjugation and/or rapid elimination. The compounds of this invention having at least one substituent adjacent to the 8-position are less prone to metabolize at that position.

The following examples are no limiting but are illustrative of this invention.

Example 1

To a stirred mixture of 1.75 g. of 5,6-dimethylisatin (B. R. Baker, et al., J. Org. Chem., 17:149, 1952) in 30 ml. of methanol is added dropwise 10 ml. of 10% methanolic potassium hydroxide followed by 1.5 ml. of dimethyl sulfate. The resulting mixture is stirred for 45 minutes. The solid is filtered off and then stirred with 25–30 ml. of water. Filtering gives 1,5,6-trimethylisatin, M.P. 192–195° C.

A mixture of 9.7 g. of 1,5,6-trimethylisatin, 5.3 g. of thiosemicarbazide, 9.0 g. of potassium carbonate and 1.2 l. of water is refluxed for 24 hours. The solid is filtered off and dried to give 1,5,6-trimethylisatin 3-thiosemicarbazone, M.P. 286–291° C. The filtrate is acidified with dilute hydrochloric acid to pH 5–6 and filtered to give 3 - mercapto - 5,7,8-trimethyl-5H-as-triazino[5,6-b]indole, M.P. 321–322° C. (dec.).

The thiosemicarbazone intermediate (9.7 g.) is refluxed with 10% aqueous potassium hydroxide solution for three hours. The mixture is then cooled and filtered. The filtrate is acidified to pH 4–5 with dilute hydrochloric acid and filtered to give additional 3-mercapto-5,7,8-trimethyl-5H-as-triazino[5,6-b]indole.

A solution of 18.6 g. of 3-mercapto-5,7,8-trimethyl-5H-as-triazino[5,6-b]indole in 250 ml. of 1 N sodium hydroxide is treated with 8.0 ml. of methyl iodide. This mixture is stirred for four hours at 0–10° C. and then for 2.5 hours at room temperature. The resulting mixture is filtered to give 5,7,8-trimethyl-3-methylthio-5H-as-triazino[5,6-b]indole, M.P. 227–230° C. (dec.).

A stirred mixture of 13.76 g. of 5,7,8-trimethyl-3-methylthio-5H-as-triazino[5,6-b]indole and 35 ml. of 4-amino-2-methyl-2-butanol is heated in an oil bath at 170–180° C. (bath temperature) for 30 hours. The excess amino alcohol is distilled off in vacuo and the residue is stirred with a small amount of acetonitrile and then filtered to give 2-methyl-4-[(5,7,8-trimethyl-5H-as-triazino[5,6-b]indol-3-yl)amino] - 2 - butanol, M.P. 202–204° C.

Example 2

To a flask are added in order 30 g. of crystalline anhydrous sodium sulfate, a solution of 4.5 g. of chloral hydrate in 60 ml. of water, 3.53 g. of 3,5-dimethylaniline in 15 ml. of water containing 2.1 ml. of concentrated hydrochloric acid and a solution of 5.5 g. of hydroxyl amine hydrochloride in 25 ml. of water. The mixture is heated with stirring to its boiling point and refluxed for five minutes and then cooled. The solid is filtered off, washed with water and triturated with acetonitrile. Filtering gives 3,5-dimethylisonitrosoacetanilide, M.P. 205–207° C.

To a cooled solution of 10 ml. of concentrated sulfuric acid is added 2.3 g. of 3,5-dimethylisonitrosoacetanilide in small portions. The solution is stirred for five minutes and then heated on a steam bath for 10 minutes, then poured onto ice. Filtering gives 4,6-dimethylisatin.

To a stirring mixture of 4.0 g. of 4,6-dimethylisatin and 45 ml. of methanol is added 22 ml. of 10% methanolic potassium hydroxide followed by 3.4 ml. of dimethyl sulfate. The resulting mixture is stirred at room temperature for one hour and then cooled with ice. The solid is filtered off to give 1,4,6-trimethylisatin.

A mixture of 2.1 g. of 1,4,6-trimethylisatin, 1.0 g. of thiosemicarbazide and 2.7 g. of potassium carbonate in 300 ml. of water is refluxed for 17 hours. The solution is filtered and the filtrate is acidified with acetic acid and filtered to give 3-mercapto-5,7,9-trimethyl-5H-as-triazino[5,6-b]indole.

To a solution of 2.55 g. of 3-mercapto-5,7,9-trimethyl-5H-as-triazino[5,6-b]indole in 60 ml. of 1 N sodium hydroxide is added 0.63 ml. of methyl iodide. This mixture is stirred for one hour at room temperature and filtered to give 5,7,9-trimethyl-3-methylthio-5H-as-triazino[5,6-b]indole, M.P. 250–252° C.

A mixture of 2.3 g. of 5,7,9-trimethyl-3-methylthio-5H-as-triazino[5,6-b]indole and 12 ml. of 4-amino-2-methyl-2-butanol is heated in an oil bath at 180° C. for 22 hours. The reaction mixture is triturated with water and the precipitated solid is filtered off, washed with water and recrystallized from ethanol to give 2-methyl-4-[(5,7,9-trimethyl - 5H - as - triazino[5,6-b]indol-3-yl)-amino]-2-butanol, M.P. 203–205° C.

Example 3

3,5-dichloroaniline (20 g.) is converted by the procedure of Example 2 to 3,5-dichloroisonitrosoacetanilide, M.P. 203–205° C.

3,5-dichloroisonitrosoacetanilide (24.5 g.) is cyclized by heating with concentrated sulfuric acid at 105° C. for 30 minutes to give 4,6-dichloroisatin, M.P. 255–257° C.

4,6-dichloroisatin (6.65 g.) is N-methylated by the procedure of Example 2 to give, upon recrystallization from glacial acetic acid, 5,6-dichloro-N-methylisatin, M.P. 192–195° C.

4,6-dichloro-N-methylisatin (8.0 g.) is converted by the procedure of Example 2 to 7,9-dichloro-3-mercapto-5-methyl-5H-as-triazino[5,6-b]indole, M.P. 296–300° C.

To a solution of 3.0 g. of 7,9-dichloro-3-mercapto-5-methyl-5H-as-triazino[5,6-b]indole in 60 ml. of 5% aqueous sodium hydroxide solution, cooled in an ice bath, is added, with stirring, 14 ml. of 30% aqueous solution of hydrogen peroxide, keeping the reaction temperature at 15–20° C. The mixture is then stirred for two hours at room temperature. The resulting suspension is acidified with glacial acetic acid and filtered to give 7,9-dichloro - 3 - hydroxy-5-methyl-5H-as-triazino[5,6-b]indole, M.P. 343–347° C. (dec.).

A mixture of 2.8 g. of 7,9-dichloro-3-hydroxy-5-methyl-5H-as-triazino[5,6-b]indole, 8 ml. of phosphorus oxychloride and 4 ml. of dimethylaniline is refluxed for 20 minutes, then cooled and poured onto ice. The solid is filtered off and recrystallized from ethanol to give 3,7,9-trichloro - 5 - methyl-5H-as-triazino[5,6-b]indole, M.P. 252–255° C.

A mixture of 1.8 g. of 3,7,9-trichloro-5-methyl-5H-as-triazino[5,6-b]indole and 1.29 g. of 4-amino-2-methyl-2-butanol in 150 ml. of toluene is refluxed for 5.5 hours. The resulting suspension is evaporated to dryness and the residue is triturated with water. The solid is filtered off and recrystallized from acetonitrile to give 4-[(7,9-dichloro-5-methyl - 5H - as - triazino[5,6-b]indol-3-yl)-amino]-2-methyl-2-butanol, M.P. 222–224° C.

Example 4

To a solution of 12.1 g. of 4-methylisatin (P. W. Sadler, J. Org. Chem., 21:169, 1956) in 125 ml. of methanol is added 77 ml. of 10% solution of potassium hydroxide in methanol followed by 11.6 ml. of dimethyl sulfate. The reaction mixture is stirred at room temperature for 1.5 hours and part of the solvent is then removed in vacuo. The solid is filtered off, washed with water and dried to give 1,4-dimethylisatin, M.P. 158–160° C.

A stirred mixture of 7.6 g. of 1,4-dimethylisatin, 4.1 g. of thiosemicarbazide, 8.0 g. of potassium carbonate and 1.3 l. of water is refluxed for four hours. Kieselguhr is added and the mixture is filtered. The filtrate is acidified with acetic acid and filtered to give 3-mercapto-5,9-dimethyl-5H-as-triazino[5,6-b]indole, M.P. 310–314° C. (dec.).

To a stirred solution of 9.5 g. of 3-mercapto-5,9-dimethyl-5H-as-triazino[5,6-b]indole in 138 ml. of 1 N sodium hydroxide is added 3.7 ml. of methyl iodide. The mixture is stirred at room temperature for two hours and then filtered to give 5,9-dimethyl-3-methylthio-5H-as-triazino[5,6-b]indole, M.P. 244–245° C.

To a solution of 5.3 g. of 5,9-dimethyl-3-methylthio-5H-as-triazino[5,6-b]indole in 45 ml. of concentrated sulfuric acid is added dropwise 1.0 ml. of concentrated nitric acid, while maintaining the temperature at 0–5° C. The resulting mixture is stirred for 3.5 hours and then poured onto ice. The solid is filtered off to give 5,9-dimethyl-3-methylthio-8-nitro-5H-as-triazino[5,6-b]indole, M.P. 261–263° C.

A mixture of 5.5 g. of 5,9-dimethyl-3-methylthio-8-nitro-5H-as-triazino[5,6-b]indole and 12 ml. of 4-amino-2-methyl-2-butanol is heated with stirring at 165–170° C. for four hours. The resulting solution is poured into water and the solid is filtered off to give 2-methyl-4-[(5,9-dimethyl-8-nitro - 5H - as-triazino[5,6-b]indol-3-yl)amino]-2-butanol, M.P. 260–262° C.

To 0.8 g. of 2-methyl-4-[(5,9-dimethyl-8-nitro-5H-as-triazino[5,6-b]indol-3-yl)amino]-2-butanol in 12 ml of ethanol at 45–50° C. is added 0.04 g. of 10% palladium on charcoal followed by 0.26 ml. of 99–100% hydrazine and another 0.015 g. of 10% palladium on charcoal. The mixture is refluxed for 1.5 hours, then cooled, treated with kieselguhr and filtered. The solvent is removed and the residue is triturated with ether and filtered. The solid is recrystallized from acetonitrile-methanol to give 4-[(8-amino-5,9-dimethyl - 5H - as - triazino[5,6-b]indol-3-yl)amino]-2-methyl-2-butanol, M.P. 227–229° C.

Example 5

6-methylisatin (P. W. Sadler, J. Org. Chem., 21:169, 1956), 15.3 g., is N-methylated by the procedure of Example 4 to give 1,6-dimethylisatin, M.P. 144–146° C.

1,6-dimethylisatin (2.8 g.) is treated with thiosemicarbazide by the procedure of Example 5 to give 3-mercapto-5,7-dimethyl - 5H - as - triazino[5,6-b]indole, M.P. 305–307° C.

3-mercapto-5,7-dimethyl - 5H - as-triazino[5,6-b]indole (2.6 g.) is treated with methyl iodide and sodium hydroxide by the procedure of Example 4 to give 5,7-dimethyl-3-methylthio - 5H - as-triazino[5,6-b]indole, M.P. 216–218° C.

5,7-dimethyl-3-methylthio - 5H - as-triazino[5,6-b]indole (1.0 g.) is nitrated at 0–5° C. by the procedure of Example 4 to give 5,7-dimethyl-3-methylthio-8-nitro-5H-as-triazino[5,6-b]indole, M.P. 263–265° C.

A mixture of 1.6 g. of 5,7-dimethyl-3-methylthio-8-nitro-5H-as-triazino[5,6-b]indole and 4-amino-2-methyl-2-butanol is heated at 165–175° C. for four hours and worked up as in Example 4 to give 2-methyl-4-[(5,7-dimethyl-8-nitro-5H-as-triazino[5,6-indol - 3 - yl)amino]-2-butanol which, after recrystallizing from ethanol-dimethylformamide, melts at 245–246° C.

2-methyl-4-[(5,7-dimethyl - 8 - nitro - 5H - as-triazino-[5,6-b]indol-3-yl)amino]-2-butanol (0.6 g.) is treated with hydrazine and 10% palladium on charcoal by the procedure described in Example 4 to give, after recrystallization from acetonitrile, 4-[(8-amino-5,7-dimethyl-5H-as-triazino[5,6-b]indol-3-yl)amino] - 2-methyl-2-butanol, M.P. 207–209° C.

Example 6

To a solution of 5.0 g. of 4-aminoveratrole in 25 ml. of benzene is added 1.66 g. of sodium hydroxide in 16 ml. of water. The resulting mixture is cooled to 20–30° C. and stirred vigorously while 4.25 g. of acetic anhydride is added. Stirring at room temperature is then continued for 1.5 hours and the solid is filtered off to give 4-acetylaminoveratrole, M.P. 130–132° C.

To a refluxing solution of 5.7 g. of 4-acetylaminoveratrole in 50 ml. of toluene is added 1.21 g. of sodium amide in small portions. The resulting mixture is refluxed for two hours and 4.03 g. of dimethyl sulfate is added in small portions. The solution is then refluxed with stirring for 0.5 hours, then cooled and water is added. The toluene layer is removed and the aqueous layer is extracted with additional toluene. The combined toluene solutions are dried and evaporated to give as the residue 4-(N-acetyl-N-methylamino)veratrole.

4-(N-acetyl-N-methylamino)veratrole (5.94 g.) is refluxed overnight with 23 ml. of ethanol containing 6.45 g. of potassium hydroxide and 3.5 ml. of water. The alcohol is then evaporated off and the residue is extracted with benzene. The benzene extract is concentrated in vacuo and the residue is distilled at 120° C. (0.1 mm.) to give 4-N-methylaminoveratrole.

To a solution of 1.0 g. of 4-N-methylaminoveratrole in 5 ml. of benzene and 0.5 ml. of pyridine is added 0.82 g. of ethyl chloroglyoxylate. The mixture is refluxed for 0.5 hours, then cooled and water is added. The benzene layer is removed, dried and concentrated in vacuo to give as the residue 4-(N-ethoxalyl-N-methylamino) veratrole.

To a solution of 1.49 g. of 4-(N-ethoxalyl-N-methylamino) veratrole in 5 ml. of carbon tetrachloride is added 1.16 g. of phosphorus pentachloride in small portions. The resulting mixture is stirred at room temperature for 15 minutes and the solvent is evaporated off. The residue is triturated with a few milliliters of ice containing 0.5 ml. of 2 N hydrochloric acid. Filtering and then crystallizing the solid from hot aqueous ethanol gives 5,6-dimethoxy-N-methylisatin, M.P. 214–216° C.

A mixture of 2.21 g. of 5,6-dimethoxy-N-methylisatin, 0.92 g. of thiosemicarbazide, 1.98 g. of potassium carbonate and 100 ml. of water is refluxed for 22 hours and then filtered. The filtrate is acidified with acetic acid and filtered to give 3-mercapto-7,8-dimethoxy-5-methyl-5H-as-triazino[5,6-b]indole, M.P. 263–266° C., which, after recrystallization from dimethylformamide, melts at 279–280° C.

A mixture of 2.0 g. of 3-mercapto-7,8-dimethoxy-5-methyl-5H-as-triazino[5,6-b]indole and 16 ml. of 4-amino-2-methyl-2-butanol is heated at 180–185° C. for 4.5 hours. The excess amino alcohol is removed in vacuo and the residue is taken up in chloroform and passed through a column of silica gel. The column is eluted with 90:10 chloroform-methanol. The selected eluate which contains the product is collected, washed with 0.1% aqueous sodium hydroxide solution and the organic solution is then dried and passed through a dry column of alumina and eluted with 95:5 chloroform-methanol. The second fraction is collected and concentrated in vacuo and the residue is recrystallized from acetonitrile to give 4-[(7,8-dimethoxy-5-methyl - 5H - as - triazino[5,6-b]indol-3-yl)-amino]-2-methyl-2-butanol, M.P. 201–202.5° C.

Example 7

3,4-methylenedioxyacetanilide (1.79 g.) is converted according to the procedure of Example 6 using sodium amide and dimethyl sulfate to 3,4-methylenedioxy-N-methylacetanilide. This compound is treated with potassium hydroxide in ethanol by the procedure of Example 6 to give 3,4-methylenedioxy-N-methylaniline. This N-methylaniline (1 g.) is treated with ethyl chloroglyoxylate and then with phosphorus pentachloride by the procedure descripted in Example 6 and the resulting solid is recrystallized from ethanol to give N-methyl-5,6-methylenedioxyisatin, M.P. 211–214° C.

N-methyl-5,6-methylenedioxyisatin (0.2 g.) is converted by the procedure of Example 2 to 3-mercapto-5-methyl-7,8-methylenedioxy-5H-as-triazino[5,6-b]indole.

This 3-mercapto compound (1 g.) is treated with hydrogen peroxide and aqueous sodium hydroxide according to the procedure of Example 3 and the resulting solid is recrystallized from ethanol to give 3-hydroxy-5-methyl-7,8 - methylenedioxy - 5H-as-triazino[5,6-b]indole, M.P. 329–338° C. (dec.).

Treating 0.3 g. of the above prepared 3-hydroxy compound with phosphorus oxychloride and dimethylaniline according to the procedure described in Example 3 and recrystallizing the resulting solid from ethanol gives 3-chloro - 5-methyl-7,8-methylendioxy-5H-as-triazino[5,6-b] indole, M.P. 263–266° C.

3 - chloro - 5 - methyl - 7,8-methylenedioxy-5H-as-triazino[5,6-b]indole (0.7 g.) is heated with 3 ml. of 4-amino-2-methyl-2-butanol at 160° C. for four hours. The reaction mixture is then poured into water and the solid is filtered off and recrystallized from acetonitrile to give 2-methyl - 4 - [(5 - methyl-7,8-methylendioxy-5H-as-triazino[5,6-b]indol - 3-yl)aminol]-2-butanol, M.P. 225–227° C.

Example 8

6 - methoxyisatin (P. W. Sadler, J. Org. Chem., 21:169, 1956), 1.77 g. is N-methylated by the procedure of Example 4 using 10% methanolic potassium hydroxide and dimethyl sulfate to give 6-methoxy-N-methylisatin, M.P. 187–189° C.

6-methoxy-N-methylisatin (2.5 g.) is treated with thiosemicarbazide and aqueous potassium carbonate by the procedure of Example 2 to give 3-mercapto-7-methoxy - 5 - methyl-5H-as-triazino[5,6-b]indole which, after recrystallization from dimethylformamide, melts at 282–284° C.

The above prepared 3-mercapto compound is treated with hydrogen peroxide and sodium hydroxide according to the procedure of Example 3 and the resulting solid is recrystallized from dimethylformamide to give 3-hydroxy-7 - methoxy - 5-methyl-5H-as-triazino[5,6-b]indole, M.P. 316–318° C.

The above prepared 3-hydroxy compound (0.5 g.) is treated with phosphorus oxychloride and dimethylaniline by the procedure of Example 3 to give, after recrystallization from ethanol using charcoal, 3-chloro-7-methoxy-5-methyl-5H-as-triazino[5,6-b]indole, M.P. 239–241° C.

3 - chloro - 7 - methoxy-5-methyl-5H-as-triazino[5,6-b] indole (0.75 g.) is nitrated using nitric acid and sulfuric acid at 0° C. by the procedure of Example 4 to give, after recrystallization from dimethylformamide-ethanol, 3-chloro - 7 - methoxy-5-methyl-8-nitro-5H-as-triazino[5,6-b]indole, M.P. 233–235° C.

A mixture of 0.4 g. of 3-chloro-7-methoxy-5-methyl-8-nitro-5H-as-triazino[5,6-b]indole, 1.5 ml. of 4-amino-2-methyl-2-butanol and 10 ml. of toluene is refluxed for five hours. The reaction mixture is worked up by the procedure of Example 3 and the resulting solid is recrystallized from ethanol to give 4-[(7-methoxy-5-methyl-8-nitro-5H-as - triazino[5,6-b]indol - 3 - yl)amino] - 2-methyl-2-butanol, M.P. 242–244° C.

4 - [(7 - methoxy - 5-methyl - 8-nitro-5H-as-triazino [5,6-b]indol - 3 - yl)amino] 2-methyl-2-butanol (0.45 g.) is reduced with hydrazine and 10% palladium on charcoal according to the procedure described for reducing the nitro compound in Example 4 to give, after recrystallization from acetonitrile, 4 - [(8-amino-7-methoxy-5-methyl - 5H - as - triazino[5,6-b]indol-3-yl)amino]-2-methyl-2-butanol, M.P. 226–228° C.

Example 9

A mixture of 3.62 g. of 6-chloroisatin (P. W. Sadler, J. Org. Chem., 21:169, 1956), 1.83 g. of thiosemicarbazide, 5.52 g. of potassium carbonate and 120 ml. of water is refluxed for three hours, then filtered. The filtrate is acidified with acetic acid and filtered to give 7-chloro-3-mercapto-5H-as-triazino[5,6-b]indole, M.P. >335° C.

To a suspension of 3.1 g. of 7-chloro-3-mercapto-5H-as-triazino[5,6-b]indole in 30 ml. of acetone is added 9 ml. of 66% aqueous potassium hydroxide solution. The mixture is stirred for five minutes and then 3 ml. of dimethyl sulfate is added. The mixture is then stirred for one hour and filtered to give 7-chloro-5-methyl-3-methylthio-5H-as-triazino[5,6-b]-indole, M.P. 222–224° C.

7 - chloro - 5 methyl-3-methylthio-5H-as-triazino[5,6-b]indole (14.5 g.) is nitrated using nitric acid and sulfuric acid at 0° C. by the procedure of Example 4 to give, after recrystallization from dimethylformamide, 7- chloro - 5 - methyl-3-methylthio-8-nitro-5H-as-triazino-[5,6-b]indole, M.P. 254–256° C.

7 - chloro - 5 - methyl-3-methylthio-8-nitro-5H-as-triazino[5,6-b]indole (0.5 g.) in 20 ml. of water is heated to boiling and 2.0 g. of sodium hydrosulfite is added. The resulting mixture is refluxed for 10 minutes and the solid is filtered off and recrystallized from dimethylformamide to give 8 - amino - 7-chloro-5-methyl-3-methylthio-5H-as-triazino[5,6-b]indole, M.P. 290–292° C.

A mixture of 2.3 g. of 8-amino-7-chloro-5-methyl-3-methylthio-5H-as-triazino[5,6-b]indole and 15 ml. of 4-amino-2-methyl-2-butanol is heated at 175° C. for eight hours. The excess amino alcohol is then evaporated off in vacuo, the residue is dissolved in 500 ml. of 90:10 chloroform-methanol and the solution is percolated down a dry column of silica gel. The column is then eluted with 90:10 chloroform-methanol. The first eluate is collected and evaporated. The residue is recrystallized from acetonitrile using charcoal to give 4-[(8-amino-7-chloro-5 - methyl - 5H-as-triazino[5,6-b]indol-3-yl)amino]-2-methyl-2-butanol, M.P. 214–216.5° C.

Example 10

4-chloroisatin (P. W. Sadler, J. Org. Chem., 21:169, 1956), 3.62 g., is treated with thiosemicarbazide and aqueous potassium carbonate by the procedure of Example 9 to give 9-chloro-3-mercapto-5H-as-triazino[5,6-b]indole, M.P. >335° C.

9 - chloro - 3 - mercapto-5H-as-triazino[5,6-b]indole (4.1 g.) is bis-methylated by the procedure of Example 9 to give 9 - chloro - 5-methyl-3-methylthio-5H-as-triazino-[5,6-b]indole.

9 - chloro - 5 - methyl - 3 - methylthio-5H-as-triazino-[5,6-b]indole (13.0 g.) is nitrated using nitric acid and sulfuric acid at 0° C. according to the procedure of Example 9 to give 9-chloro-5-methyl-3-methylthio-8-nitro-5H-as-triazino[5,6-b]indole, M.P. 243–250° C.

9 - chloro - 5 - methyl-3-methylthio-8-nitro-5H-as-triazino[5,6-b]indole (0.5 g.) is treated with sodium hydrosulfite according to the procedure described in Example 9. The product is purified by passing through a silica gel column by the procedure described in Example 9 to give 8 - amino - 9 - chloro-5-methyl-3-methylthio-5H-as-triazino[5,6-b]indole, M.P. 276–278° C.

A mixture of 2.5 g. of 8-amino-9-chloro-5-methyl-3-methylthio-5H-as-triazino[5,6-b]indole and 15 ml. of 4-amino-2-methyl-2-butanol is heated at 170° C. for five hours to give, after working up by the procedure of Example 2 and recrystallizing from acetonitrile, 4-[(8-amino - 9 - chloro - 5-methyl-5H-as-triazino[5,6-b]indol-3-yl)amino]-2-methyl-2-butanol. M.P. 249–251° C.

Example 11

To a solution of 10 g. of 4-chloro-N-methylisatin (prepared by N-methylating 4-chloroisatin by the procedure described in Example 1) in 500 ml. of acetic acid at 50° C. is added 25 ml. of bromine in portions. The resulting mixture is then stirred at room temperature for 5.5 hours and then evaporated to dryness. The residue is recrystallized from acetic acid to give 5-bromo-4-chloro-N-methylisatin, M.P. 254–257° C.

5-bromo-4-chloro-N-methylisatin is treated with thiosemicarbazide and aqueous potassium carbonate by the procedure described in Example 2 to give 8-bromo-9-chloro - 3 - mercapto - 5 - methyl - 5H-as-triazino[5,6-b]-indole, M.P. 320–325° C.

8 - bromo - 9 - chloro - 3-mercapto-5-methyl-5H-as-triazino[5,6-b]indole (13.0 g.) is treated with hydrogen peroxide and sodium hydroxide by the procedure of Example 3 to give 8-bromo-9-chloro-3-hydroxy-5-methyl-5H-as-triazino[5,6-b]indole, M.P. >325° C.

8 - bromo - 9 - chloro - 3 - hydroxy-5-methyl-5H-as-triazino[5,6-b]indole (11.0 g.) is treated with phosphorus oxychloride and dimethylaniline according to the procedure described in Example 3 to give 8-bromo-3,9-dichloro - 5-methyl-5H-as-triazino[5,6-b]indole, M.P. 285–286° C.

A mixture of 2.0 g. of 8-bromo-3,9-dichloro-5-methyl-5H-as-triazino[5,6-b]indole and 2.0 g. of 4-amino-2-methyl-2-butanol in 300 ml. of toluene is refluxed for 3.5 hours. The reaction mixture is worked up by the procedure described in Example 3 to give 4-[(8-bromo-9-chloro - 5-methyl-5H-as-triazino[5,6-b]indol-3-yl)amino]-2-methyl-2-butanol, M.P. 255–257° C.

Example 12

6-chloro-N-methylisatin (7.5 g.) is brominated by the procedure described in Example 11 to give 5-bromo-6-chloro-N-methylisatin, M.P. 216–219° C.

5-bromo-6-chloro-N-methylisatin (10.0 g.) is reacted with thiosemicarbazide by the procedure of Example 2 to give, after recrystallization from aqueous dimethylformamide, 8 - bromo-7-chloro-3-mercapto-5-methyl-5H-as-triazino[5,6-b]indole, M.P. 291–293° C.

8 - bromo - 7 - chloro - 3-mercapto-5-methyl-5H-as-triazino[5,6-b]indole (2.6 g.) is treated with hydrogen peroxide and sodium hydroxide by the procedure described in Example 3 to give 8-bromo-7-chloro-3-hydroxy-5-methyl-5H-as-triazino[5,6-b]indole, M.P. >335° C.

8 - bromo - 7 - chloro - 3 - hydroxy-5-methyl-5H-as-triazino[5,6-b]indole (2.4 g.) is treated with phosphorus oxychloride and dimethylaniline by the procedure of Example 3 to give 8-bromo-3,7-dichloro-5-methyl-5H-as-triazino[5,6-b]indole, M.P. 267–269° C.

A mixture of 1.0 g. of 8-bromo-3,7-dichloro-5-methyl-5H-as-triazino[5,6-b]indole and 1.0 g. of 4-amino-2-methyl-2-butanol in 150 ml. of toluene is heated for six hours and worked up by the procedure of Example 3 to give, after recrystallization from acetonitrile, 4-[(8-bromo-7 - chloro - 5 - methyl - 5H - as-triazino[5,6-b]indol-3-yl)-amino]-2-methyl-2-butanol. After further purification by chromatography through a silica gel column and second recrystallization from acetonitrile, the product melts at 232–234° C.

Example 13

4,5-dimethylisatin (7.0 g.) is N-methylated by the procedure of Example 1 to give, after recrystallization from ethanol, 1,4,5-trimethylisatin, M.P. 155–156° C.

A stirred mixture of 1.89 g. of 1,4,5-trimethylisatin, 1.02 g. of thiosemicarbazide, 1.74 g. of potassium carbonate and 240 ml. of water is heated under reflux for 22 hours. The resulting solution is acidified with acetic acid and then filtered to give 3-mercapto-5,8,9-trimethyl-5H-as-triazino[5,6-b]indole, M.P. 316–318° C. (dec.).

A solution of 4.88 g. of 3-mercapto-5,8,9-trimethyl-5H-as-triazino[5,6-b]indole in 60 ml. of 1 N sodium hydroxide is treated with 1.62 ml. of methyl iodide at 10° C. The mixture is then stirred for 1.5 hours and filtered to give 5,8,9 - trimethyl-3-methylthio-5H-as-triazino[5,6-b]-indole. After recrystallization from dimethylformamide, the product melts at 259–260° C.

A stirred mixture of 2.58 g. of 5,8,9-trimethyl-3-methylthio-5H-as-triazino[5,6-b]indole and 10 ml. of 4-amino-2-methyl-2-butanol is heated in an oil bath at 190–195° C. for 24 hours, then poured into water. Filtering and recrystallizing from n-propanol with charcoal gives 2-methyl-4-[(5,8,9 - trimethyl - 5H - as - triazino[5,6 - b]indol-3-yl)-amino]-2-butanol which after a further recrystallization from n-propanol melts at 219–221° C.

Example 14

A mixture of 2.5 g. of 6-chloro-5-methoxyisatin, 1.38 g. of thiosemicarbazide and 3.6 g. of potassium carbonate in 180 ml. of water is refluxed for 2.5 hours. The resulting solution is acidified with acetic acid and then filtered to give 7 - chloro - 3-mercapto-8-methoxy-5H-as-triazino-[5,6-b]indole, M.P. 300–305° C. (dec.).

To a suspension of 1.03 g. of 7-chloro-3-mercapto-8-methoxy-5H-as-triazino[5,6-b]indole in 9 ml. of acetone is added 2 ml. of 66% aqueous potassium hydroxide solution, followed by 0.7 ml. of dimethyl sulfate. This mixture is then stirred for 8–10 minutes, cooled and the solid is filtered off and dried to give 7-chloro-8-methoxy-5-methyl - 3 - methylthio-5H-as-triazino[5,6-b]indole which after recrystallizing from methanol-dimethylformamide with charcoal melts at 259–260° C.

A mixture of 1.0 g. of 7-chloro-8-methoxy-5-methyl-3-methylthio - 5H - as-triazino[5,6-b]indole and 5 ml. of 4-amino-2-methyl-2-butanol is heated at 165–170° C. for 3.5 hours. The mixture is then poured into water and the solid material is filtered off and recrystallized from ethanol with charcoal to give 4-[(7-chloro-8-methoxy-5-methyl - 5H - as-triazino[5,6-b]indol-3-yl)amino]-2-methyl-2-butanol, M.P. 252–253° C.

Example 15

3 - mercapto - 7,8 - dimethoxy-5-methyl-5H-as-triazino-[5,6-b]indole (1.0 g.), prepared as in Example 6, is refluxed with 50 ml. of 48% hydrobromic acid for two hours under nitrogen. The resulting mixture is filtered to give 7,8 - dihydroxy-3-mercapto-5-methyl-5H-as-triazino-[5,6-b]indole.

A mixture of 7,8-dihydroxy-3-mercapto-5-methyl-5H-as-triazino[5,6-b]indole and 4-amino-2-methyl-2-butanol is heated at 180° C. for four hours to give, after working up by the procedure described in Example 6, 4-[(7,8-dihydroxy - 5-methyl-5H-as-triazino[5,6-b]indol-3-yl)amino]-2-methyl-2-butanol.

Example 16

8 - amino - 7 - chloro-5-methyl-3-methylthio-5H-as-triazino[5,6-b]indole, prepared as in Example 9, is heated with an excess of ethyl formate at 110° C. in a bomb to give, after concentrating in vacuo, 7-chloro-8-formamido-5-methyl-3-methylthio-5H-as-triazino[5,6-b]indole.

A mixture of 7-chloro-8-formamido-5-methyl-3-methylthio-5H-as-triazino[5,6-b]indole and 4-amino-2-methyl-2-butanol is heated at 180° C. for three hours. After working up as in Example 1, 4-[(7-chloro-8-formamido-5-methyl - 5H - as - triazino[5,6 - b]indol - 3 - yl)amino]-2-methyl-2-butanol is obtained.

Reacting 8-amino-7-chloro-5-methyl-3-methylthio-5H-as-triazino[5,6-b]indole with acetic anhydride in water gives 8 - acetamido-7-chloro-5-methyl-3-methylthio-5H-as-triazino[5,6-b]indole.

Reacting 8 - acetamido-7-chloro-5-methyl-3-methylthio-5H-as-triazino[5,6-b]indole with 4-amino-2-methyl-2-butanol gives 4-[(8-acetamido-7-chloro-5-methyl-5H-as-triazino[5,6-b]indol-3-yl)amino]-2-methyl-2-butanol.

Example 17

By the procedure of Example 11, using N-methyl-6-nitroisatin in place of 4-chloro-N-methylisatin, the product is 4 - [(8-bromo-5-methyl-7-nitro-5H-as-triazino[5,6-b]indol-3-yl)amino]-2-methyl-2-butanol. Reducing with hydrazine and palladium on charcoal by the procedure of Example 4 gives 4-[(7-amino-8-bromo-5-methyl-5H-as-triazino[5,6-b]indol-3-yl)amino]-2-methyl-2-butanol.

Example 18

4 - [(8 - bromo - 5 - methyl - 7 - nitro - 5H - as - triazino[5,6-b]indol-3-yl)amino] - 2-methyl-2-butanol, prepared as in Example 17, is reacted with liquid ammonia in the presence of a small amount of copper and powdered cuprous chloride in a bomb at 110° C. for seven hours. Working up by extracting with chloroform and 10% aqueous ammonium hydroxide, drying and concentrating the chloroform extract, placing it on a silica gel column, washing with chloroform, eluting with 99:1 chloroform-methanol and removing the solvent gives 4-[(8-amino-5-methyl - 7 - nitro - 5H-as-triazino[5,6-b]indol-3-yl)amino]-2-methyl-2-butanol.

Reacting 4 - [(8 - bromo - 5 - methyl-7-nitro-5H-as-triazino[5,6-b]indol-3-yl)amino]-2-methyl-2 - butanol with the following amines:

methylamine
ethylamine
dimethylamine
diethylamine gives the following products:

2 - methyl - 4 - [(5-methyl-8-methylamino-7-nitro-5H-as-triazino[5,6-b]indol-3-yl)amino]-2-butanol 4 - [(8 - ethylamino - 5 - methyl-7-nitro-5H-as-triazino[5,6-b]indol-3-yl)amino]-2-methyl-2-butanol 4 - [(8 - dimethylamino - 5 - methyl-7-nitro-5H-as-triazino[5,6-b]indol-3-yl)amino]-2-methyl-2-butanol 4 - [(8 - diethylamino - 5 - methyl - 7-nitro-5H-as-triazino[5,6-b]indol-3-yl)amino]-2-methyl-2-butanol.

Treating 2-methyl-4-[(5-methyl-8-methylamino-7-nitro-5H-as-triazino[5,6-b]indol-3-yl)amino] - 2 - butanol with acetic anhydride in water gives 2-methyl-4-[(5-methyl-8-N - methylacetamido - 7 - nitro-5H-as-triazino[5,6-b]indol-3-yl)amino]-2-butanol.

Example 19

4 - trifluoromethylisatin is N-methylated by the procedure of Example 2 and the resulting N-methyl-4-trifluoromethylisatin is converted by the procedure of Example 4 to 4 - [(8-amino-5-methyl-9-trifluoromethyl-5H-as-triazino[5,6-b]indol-3-yl)amino]-2-methyl-2-butanol.

Example 20

To a stirring suspension of 2.5 g. of 6-methoxy-N-methylisatin in 90 ml. of glacial acetic acid is added dropwise a solution of 1.04 g. of bromine in 5.8 ml. of acetic acid. The mixture is stirred at room temperature for three hours, then poured into 500 ml. of water. The solid is filtered off, dried and recrystallized from 30:70 ethanol-dimethylformamide to give 5-bromo-6-methoxy-N-methylisatin.

A mixture of 3.5 g. of 5-bromo-6-methoxy-N-methylisatin, 1.34 g. of thiosemicarbazide and 2.3 g. of potassium carbonate in 300 ml. of water is refluxed for 11 hours. The mixture is filtered and the filtrate is acidified with glacial acetic acid. The solid is filtered off and dried to give 8-bromo - 3 - mercapto - 7 - methoxy-5-methyl-5H-as-triazino[5,6-b]indole.

Reacting 8 - bromo - 3 - mercapto - 7 - methoxy - 5-methyl-5H-as-triazino[5,6-b]indole with hydrogen peroxide and aqueous sodium hydroxide by the procedure of Example 3 and treating the resulting 8-bromo-3-hydroxy-7 - methoxy - 5 - methyl-5H-as-triazino[5,6-b]indole with phosphorus oxychloride and dimethylaniline gives 8-bromo - 3 - chloro - 7 - methoxy - 5 - methyl - 5H - as-triazino[5,6-b]indole. Cleaving the 7-methoxy group by refluxing with 48% hydrobromic acid and treating the resulting 7-hydroxy compound with 4-amino-2-methyl-2-butanol gives 4-[(8-bromo-7-hydroxy-5-methyl-5H-as-triazino[5,6-b]indol-3-yl)amino]-2-methyl-2-butanol.

Example 21

By the procedure of Example 10, using 4-fluoroisatin in place of 4-chloroisatin as starting material, the product is 4 - [(8 - amino-9-fluoro-5-methyl-5H-as-triazino[5,6-b]indole-3-yl)amino]-2-methyl-2-butanol.

Example 22

By the procedure of Example 6, using 3-chloro-4-methylthioaniline in place of 4-aminoveratrole, 7-chloro-3-mercapto - 5 - methyl - 8 - methylthio - 5H - as - triazino[5,6-b]indole is obtained. Reacting this intermediate with 4-amino - 2 - methyl - 2 - butanol gives 4-[(7-chloro-5-methyl - 8 - methylthio - 5H - as - triazino[5,6-b]indol-3-yl)amino]-2-methyl-2-butanol.

Refluxing 7 - chloro - 3 - mercapto - 5 - methyl - 8-methylthio - 5H - as - triazino[5,6-b]indole (2.0 g.) with 40 ml. of 48% hydrobromic acid for two hours under nitrogen, then filtering gives 7 - chloro - 3,8 - dimercapto-5 - methyl - 5H - as - triazino[5,6-b]indole. Reacting this intermediate with 4-amino-2-methyl-2-butanol gives 4-[(7-chloro - 8 - mercapto - 5 - methyl - 5H - as - triazino[5,6-b]indol-3-yl)amino]-2-methyl-2-butanol.

Example 23

3 - bromo - p - anisidine is treated with sodium sulfate, chloral hydrate and hydroxylamine hydrochloride and the resulting isonitrosoacetanilide is cyclized using sulfuric acid by the procedure of Example 2 to give 6-bromo-5-methoxyisatin and 4-bromo-5-methoxyisatin. These isomers are separated by preferential acid precipitation procedures (P. W. Sadler, J. Org. Chem., 21:169, 1956).

The isatins are N-methylated, then treated with thiosemicarbazide and aqueous potassium carbonate according to the procedure of Example 2 to give 7-bromo-3-mercapto - 8 - methoxy-5-methyl-5H-as-triazino[5,6-b]indole and 9 - bromo - 3 - mercapto-8-methoxy-5-methyl-5H-as-triazino[5,6-b]indole. These intermediates are S-methylated by the procedure of Example 2 and then the methoxy group on each compound is cleaved by treating with 48% hydrobromic acid to give the corresponding hydroxy compounds.

Heating the above prepared 7-bromo-8-hydroxy-5-methyl-3-methylthio-5H-as-triazino[5,6-b]indole and 9-bromo-8 - hydroxy - 5-methyl-3-methylthio-5H-as-triazino[5,6-b]indole with 4-amino-2-methyl-2-butanol gives 4-[(7-bromo - 8 - hydroxy-5-methyl-5H-as-triazino[5,6-b]indol-3-yl)amino]-2-methyl - 2 - butanol and 4-[(9-bromo-8-hydroxy - 5 - methyl - 5H - as - triazino[5,6-b]indol - 3 - yl)amino]-2-methyl-2-butanol.

Example 24

By the procedure of Example 23 using in place of 3-bromo-p-anisidine the following (a) 3-chloro-p-anisidine
(b) 3-fluoro-p-anisidine
(c) 3-methyl-p-anisidine
(d) 3-trifluoromethyl-p-anisidine
(e) 3,5-dichloro-p-anisidine
(f) 3-chloro-2,4-dimethoxyaniline
(g) 5-amino-o-anisic acid
(h) methyl 5-amino-o-toluate the products are, respectively:

(a) 4 - [(7 - chloro - 8 - hydroxy - 5 - methyl-5H-as-triazino[5,6-b]indol - 3 - yl)amino] - 2-methyl-2-butanol and 4 - [(9 - chloro - 8 - hydroxy - 5-methyl-5H-as-triazino[5,6-b]indol-3-yl)aminol]-2-methyl-2-butanol (b) 4 - [(7 - fluoro - 8 - hydroxy - 5 - methyl-5H-as-triazino[5,6-b]indol - 3 - yl)amino]-2-methyl-2-butanol and 4 - [(9 - fluoro - 8 - hydroxy - 5 - methyl - 5H - as-triazino[5,6-b]indol-3-yl)amino]-2-methyl-2-butanol (c) 4 - [(8 - hydroxy - 5,7 - dimethyl - 5H - as - triazino[5,6-b]indol - 3 - yl)amino] - 2 - methyl - 2 - butanol and 4 - [(8 - hydroxy - 5,9 - dimethyl - 5H - as - triazino[5,6-b]indol-3-yl)amino]-2-methyl-2-butanol (d) 4 - [(8 - hydroxy - 5 - methyl - 9 - trifluoromethyl-5H - as - triazino[5,6-b]indol - 3 - yl)amino]-2-methyl 2-butanol (e) 4 - [(7,9 - dichloro - 8 - hydroxy - 5 - methyl-5H-as - triazino[5,6-b]indol - 3 - yl)amino]-2-methyl-2-butanol (f) 4 - [(7 - chloro - 6,8 - dihydroxy - 5 - methyl-5H-as - triazino[5,6-b]indol-3-yl)amino]-2-methyl-2-butanol (g) 4 - [(9 - carboxy - 8 - hydroxy - 5-methyl-5H-as-triazino[5,6-b]indol - 3 - yl)amino] - 2 - methyl-2-butanol and 4 - [(7 - carboxy - 8 - hydroxy-5-methyl-5H-as-triazino[5,6-b]indol-3-yl)amino]-2-methyl-2-butanol (h) 4 - [(9 - carbomethoxy - 5,8 - dimethyl-5H-as-triazino[5,6-b]indol - 3 - yl)amino] - 2 - methyl-2-butanol and 4 - [(7 - carbomethoxy - 5,8 - dimethyl - 5H - as-triazino[5,6-b]indol-3-yl)amino]-2-methyl-2-butanol.

Example 25

By procedures described hereabove, using 4,5,7-tribromoisatin as starting material, 4-[(6,8,9-tribromo-5-methyl - 5H - as - triazino[5,6-b]indol-3-yl)amino]-2-methyl-2-butanol is obtained.

Example 26

Using 4,6-dimethoxyisatin in the procedure of Example 8, 4 - [(7,9 - dimethoxy - 5 - methyl - 8 - nitro-5H-as-triazino[5,6-b]indol - 3 - yl)amino] - 2 - methyl-2-butanol is obtained. Reducing the nitro group by the procedure described in Example 4 gives 4 - [(8 - amino-7,9-dimethoxy - 5 - methyl - 5H-as-triazino[5,6-b]indol-3-yl)amino] 2-methyl-2-butanol.

Example 27

Brominating 4,6 - dimethoxyisatin by the procedure of Example 20 gives 5 - bromo - 4,6-dimethoxyisatin. This intermediate is treated with thiosemicarbazide and aqueous potassium carbonate according to the procedure of Example 2 to give 8-bromo-3-mercapto-7,9-dimethoxy-5-methyl - 5H - as - triazino[5,6-b]indole. This intermediate is converted by the procedure described in Example 2 to 4 - [(8 - bromo - 7,9 - dimethoxy-5-methyl-5H-as triazino-[5,6-b]indol-3-yl)amino]-2-methyl-2-butanol.

Chlorinating 4,6-dimethoxyisatin with N-chlorosuccinimide in methylene chloride, treating the resulting 5-chloro-4,6-dimethoxyisatin with thiosemicarbazide and aqueous potassium carbonate by the procedure of Example 2 and treating the resulting 8-chloro-3-mercapto-7,9 - dimethoxy - 5 - methyl - 5H - as-triazino[5,6-b]indole according to the procedure described in Example 2 gives 4 - [(8 - chloro - 7,9-dimethoxy-5-methyl-5H-as-triazino[5,6-b]indol - 3 - yl)amino] - 2-methyl-2-butanol.

Example 28

N methyl-6-nitroisatin is converted by the procedure of Example 2 to 5-methyl-3-methylthio-7-nitro-5H-as-triazino[5,6-b]indole. Nitrating by the procedure of Example 4 gives 5 - methyl - 3 - methylthio-7,8-dinitro-5H-as-triazino[5,6-b]indole. Reducing the nitro groups using sodium hydrosulfite by the procedure of Example 9 and reacting the resulting 7,8-diamino-5-methyl-3-methylthio-5H-as-triazino[5,6-b]indole with 4 - amino - 2-methyl-2-butanol gives 4 - [(7,8 - diamino-5-methyl-5H-as-triazino-[5,6-b]indol-3-yl)amino]-2-methyl-2-butanol.

Example 29

By the procedure of Example 2, 6-methoxyisatin is reacted with thiosemicarbazide to give 3-mercapto-7-methoxy-5H-as-triazino[5,6-b]indole. This intermediate is reacted according to the procedure of Example 8 to give 4 - [(7 - methoxy - 8 - nitro - 5H - as - triazino[5,6-b] indol-3-yl)amino]-2-methyl-2-butanol. Reducing the nitro group gives 4-[(8-amino-7-methoxy-5H-as-triazino[5,6-b]indol-3-yl)amino]-2-methyl-2-butanol.

Example 30

6-chloro-5-methoxyisatin is treated with ethyl bromide and the resulting 6-chloro-N-ethyl-5-methoxyisatin is converted, according to the procedure of Example 2, to 4-[(7-chloro - 5-ethyl-8-methoxy-5H-as-triazino[5,6-b]indol-3-yl)amino]-2-methyl-2-butanol.

By the same procedure, using propyl bromide in place of ethyl bromide the product is 4-[(7-chloro-8-methoxy-5 - propyl - 5H - as - triazino[5,6-b]indol-3-yl)amino]-2-methyl-2-butanol.

Example 31

8 - amino - 7 - chloro - 5 - methyl - 3 - methylthio-5H-as-triazino[5,6-b]indole, prepared as in Example 9, is reacted with 3-aminopropanol at 170° C. for 12 hours. The reaction mixture is triturated with water and filtered to give 3 - [(8 - amino - 7 - chloro - 5 - methyl-5H-as-triazino[5,6-b]indol-3-yl)amino]propanol.

By the same procedure using in place of 3-aminopropanol the following compounds:

2-aminoethanol
6-aminohexanol
3-N-methylaminopropanol
3-amino-1,2-propanediol the following products are prepared, respectively:

2 - [(8 - amino - 7 - chloro - 5 - methyl-5H-as-triazino-[5,6-b]indol-3-yl)amino]ethanol 6 - [(8 - amino - 7 - chloro - 5 - methyl-5H-as-triazino-[5,6-b]indol-3-yl)amino]hexanol 3 - [8 - amino - 7 - chloro - 5 - methyl-5H-as-triazino-[5,6-b]indol-3-yl)-N-methylamino]propanol 3 - [(8 - amino - 7 - chloro - 5 - methyl-5H-as-triazino-[5,6-b]indol-3-yl)amino-1,2-propanediol.

Example 32

Five grams of 1,4,6-trimethylisatin, prepared as in Example 2, is dissolved in 100 ml. of acetic acid and the solution is cooled to about 15° C. Bromine (15.0 ml.) is then added in one portion and the mixture is stirred for two hours at room temperature. The excess bromine and the acetic acid are evaporated off in vacuo to give as the residue 5,7-dibromo-1,4,6-trimethylisatin, M.P. 191–198° C.

5,7 - dibromo-1,4,6-trimethylisatin (2.68 g.) is mixed with 0.92 g. of thiosemicarbazide and 2.8 g. of potassium carbonate in 200 ml. of water. The resulting mixture is refluxed for 11 hours, then acidified with acetic acid and filtered to give 6,8 - dibromo-3-mercapto-5,7,9-trimethyl-as-triazino[5,6-b]indole, M.P. 270–275° C.

The above prepared 3-mercapto compound (2.7 g.) is dissolved in 40 ml. of hot 5% aqueous sodium hydroxide solution. The mixture is cooled to room temperature and then 9 ml. of 30% aqueous hydrogen peroxide is added in one portion. After stirring at room temperature for 2.5 hours, then acidifying with acetic acid, filtering and washing the solid collected with water, 6,8-dibromo-3-hydroxy-5,7,9-trimethyl-as-triazino[5,6-b]indole is obtained, M.P. about 300–305° C.

The above prepared 3-hydroxy compound (2.6 g.) is suspended in 8 ml. of phosphorus oxychloride and 4 ml. of dimethylaniline, then the mixture is refluxed for 20 minutes, cooled, poured over ice and the resulting precipitate is filtered off to give 6,8-dibromo-3-chloro-5,7,9-trimethyl-as-triazino[5,6-b]indole, M.P. about 256–272° C.

The above prepared 3-chloro compound (2.5 g.) is suspended in 500 ml. of toluene to which 1.4 g. of 4-amino-2-methyl-2-butanol is added. The mixture is heated at reflux for 16 hours. The solvent is evaporated in vacuo and the residue is eluted through a dry column of silica gel with 80:20 chloroform-methanol, then through another dry column of silica gel, first eluting with 80:20 chloroform-acetone and then with 90:10 chloroform-methanol. The solution from the last elution is evaporated in vacuo and the residue is treated with hot ethanol. After filtering, cooling the filtrate and filtering off the precipitate, 4-[(6,8-dibromo - 5,7,9 - trimethyl-5H-as-triazino[5,6-b]indol-3-yl)amino] - 2 - methyl-2-butanol, M.P. 229–231° C., is obtained.

Example 33

Two grams of 4 - [(8-amino-5,7-dimethyl-5H-as-triazino-[5,6-b]indol-3-yl)amino]-2-methyl-2-butanol is dissolved in 25–30 ml. of ethanol with warming. After cooling to room temperature, the solution is treated with ethereal hydrogen chloride until it is acidic and then it is diluted with several volumes of ether. The solid is filtered off, washed with ether, dried, recrystallized from methanol-ethyl acetate, washed with ether and dried to give the dihydrochloride salt of 4-[(8-amino-5,7-dimethyl-5H-as-triazino[5,6-b]indol-3-yl)amino]-2-methyl-2-butanol.

Example 34

To a solution of 7.25 g. of 8-bromo-3-mercapto-7-methoxy - 5-methyl-5H-as-triazino[5,6-b]indole, prepared as in Example 20, in 75 ml. of 1 N sodium hydoxide is added 1.9 ml. of methyl iodide. The mixture is stirred for three hours at room temperature. The solid is filtered off, dried and recrystallized from ethanol-dimethylformamide using charcoal to give 8 - bromo-7-methoxy-5-methyl-3-methylthio-5H-as-triazino[5,6-b]indole.

Two grams of 8-bromo-7-methoxy-5-methyl-3-methylthio-5H-as-triazino[5,6-b]indole is dissolved in 100 ml. of 5 N sulfuric acid. The solution is treated with 36 ml. of 3% aqueous solution of potassium permanganate. The mixture is allowed to stand for 12 hours, then poured into water. Filtering gives 8 - bromo-7-methoxy-5-methyl-3-methylsulfonyl-5H-as-triazino[5,6-b]indole.

The above prepared 3-methylsulfonyl compound is heated at reflux in xylene with 4-amino-2-methyl-2-butanol to give 4 - [(8-bromo-7-methoxy-5-methyl-5H-as-triazino[5,6-b]indol-3-yl)-amino]-2-methyl-2-butanol.

Example 35

A mixture of 4.0 g. of 4-[(8-bromo-7-methoxy-5-methyl - 5H - as-triazino[5,6-b]indol-3-yl)amino]-2-methyl-2-butanol, prepared as in Example 34, 1.7 g. of cuprous cyanide and 25 ml. of dimethylformamide is heated at reflux for three hours. The reaction mixture is treated with aqueous sodium cyanide and worked up using the procedure of Friedman and Shechter, J. Org. Chem., 26:2522, 1961, to give 4-[(8-cyano-7-methoxy-5-methyl-5H-as-triazino[5,6-b]indol-3-yl)amino]-2-methyl-2-butanol.

Example 36

A mixture of 3.0 g. of 8-bromo-3-mercapto-7-methoxy-5-methyl-5H-as-triazino[5,6-b]indole, prepared as in Example 23, 1.5 g. of cuprous cyanide and 25 ml. of dimethylformamide is heated at reflux for three hours. The reaction mixture is worked up by the procedure of Example 35 to give 8-cyano-3-mercapto-7-methoxy-5-methyl-5H-as-triazino[5,6-b]indole.

A mixture of 2.0 g. of 8-cyano-3-mercapto-7-methoxy-5 - methyl-5H-as-triazino[5,6-b]indole and 15 ml. of 35% hydrochloric acid is stirred at 40° C. for 40 minutes. Cold distilled water is then added with stirring and the mixture is cooled and filtered to give 8-carbamoyl-3-mercapto-7-methoxy-5-methyl-5H-as-triazino[5,6-b]indole.

The above prepared intermediate is S-methylated and the resulting 8 - carbamoyl-7-methoxy-5-methyl-3-methylthio-5H-as-triazino[5,6-b]indole is reacted with 4-amino-2 - methyl - 2 - butanol to give 4-[(8-carbamoyl-7-methoxy - 5 - methyl-5H-as-triazino[5,6-b]indol-3-yl)amino]-2-methyl-2-butanol.

Example 37

Two grams of 4-[(8-cyano-7-methoxy-5-methyl-5H-as-triazino[5,6-b]indol - 3 - yl)amino]-2-methyl-2-butanol, prepared as in Example 35, is dissolved in ethanol and dry hydrogen chloride is passed into the solution in an ice-salt bath for about four hours with stirring. The mixture is allowed to stand at room temperature, then treated with ethanol and an excess of ethanolic ammonia solution with stirring. The mixture is filtered and the filtrate is concentrated, then cooled and filtered to give 4-[(8-amidino - 7 - methoxy - 5-methyl-5H-as-triazino[5,6-b]indol-3-yl)amino]-2-methyl-2-butanol.

Example 38

A mixture of 1 g. of 5,7-dimethyl-3-methylthio-5H-as-triazino[5,6-b]indole, prepared as in Example 5, 2 g. of methanesulfonic anhydride and 10 ml. of sym.-tetrachloroethane is heated at reflux for 24 hours. Working up by washing the reaction mixture with two 10 ml. portions of warm water and concentrating in vacuo gives 5,7-dimethyl - 8 - methylsulfonyl-3-methylthio-5H-as-triazino[5,6-b]indole. Treating this intermediate with 4-amino-2-methyl- 2-butanol gives 2 - methyl-4-[(5,7-dimethyl-8-methylsulfonyl-5H-as-triazino[5,6-b]indol-3-yl)amino]2-butanol.

Example 39

5,7 - dimethyl - 3-methylthio-5H-as-triazino[5,6-b]indole, prepared as in Example 5, is reacted with phosphorus oxychloride and dimethylformamide at 60° C. to give 8-formyl - 5,7 - dimethyl-3-methylthio-5H-as-triazino[5,6-b] indole.

The above prepared 8 - formyl-5,7-dimethyl-3-methylthio-5H-as-triazino[5,6-b]indole is reacted with 4-amino-2-methyl-2-butanol to give 4-[(8-formyl-5,7-dimethyl-5H-as-triazino[5,6-b]indol-3-yl)amino]-2-methyl-2-butanol.

Example 40

A mixture of 2.4 g. of 5,7-dimethyl-3-methylthio-5H-as-triazino[5,6-b]indole, prepared as in Example 5, 4.1 g. of thallic acetate and 50 ml. of dimethylformamide is heated at 80° C. for eight hours. The mixture is concentrated and filtered. The filtrate is concentrated in vacuo to give 8-acetyl-5,7-dimethyl - 3 - methylthio-5H-as-triazino [5,6-b]indole. This intermediate is heated with 4-amino-2-methyl-2-butanol at 170° C. for six hours to give 4-[(8 - acetyl-5,7-dimethyl-5H-as-triazino[5,6-b]indol-3-yl) amino]-2-methyl-2-butanol.

Example 41

1,4,6-trimethylisatin (11.35 g.) is treated with thiosemicarbazide by the procedure described in Example 2 to give 3-mercapto-5,7,9-trimethyl-5H-as-triazino[5,6-b] indole.

The above prepared 3-mercapto compound (14.6 g.) is treated with methyl iodide and sodium hydroxide by the procedure of Example 4 to give, after recrystallization from benzene, 5,7,9-trimethyl-3-methylthio-5H-as-triazino [5,6-b]indole, M.P. 248–251° C.

The above prepared 3-methylthio compound (2.58 g.) is nitrated at 0-5° C. by the procedure of Example 4 to give, after recrystallization from acetonitrile, 5,7,9-trimethyl - 3 - methylthio - 8 - nitro-5H-as-triazino[5,6-b]indole, M.P. 260–262° C.

A mixture of 1.0 g. of 5,7,9-trimethyl-3-methylthio-8-nitro-5H-as-triazino[5,6-b]indole and 4 ml. of 4-amino-2-methyl-2-butanol is heated at 150° C. for four hours. The resulting suspension is cooled and poured into ice-water. Filtering gives 2-methyl-4-[(5,7,9-trimethyl-8-nitro-5H-as-triazino[5,6-b]indol-3-yl)-amino]-2-butanol, M.P. 251–254° C.

2 - methyl-4-[(5,7,9-trimethyl - 8 - nitro-5H-as-triazino [5,6-b]indol - 3 - yl)amino]-2-butanol (3.0 g.) is treated with hydrazine and 10% palladium on charcoal by the procedure described in Example 4 to give, after passing through a dry column of alumina and eluting with 90:10 chloroform-isopropanol, 4-[(8-amino-5,7,9-trimethyl-5H-as-triazino[5,6-b]indol-3-yl)amino]-2-methyl - 2 - butanol, M.P. 207–209° C.

Example 42

6-chloroisatin is N-benzylated by treating with benzyl bromide and sodium amide in liquid ammonia and the resulting N-benzyl-6-chloroisatin is reacted according to the procedure of Example 9 to give 4-[(8-amino-5-benzyl-7 - chloro-5H-as-triazino[5,6-b]indol-3-yl)amino]-2-methyl-2-butanol.

Similarly, using phenethyl bromide in place of benzyl bromide, the product is 4-[(8-amino-7-chloro-5-phenethyl-5H-as-triazino[5,6-b]indol - 3 - yl)amino]-2-methyl-2-butanol.

Example 43

To 10.0 g. of 1,4,6-trimethylisatin in 2 l. of carbon tetrachloride is added, in one portion, 9.43 g. of N-bromosuccinimide. The resulting mixture is refluxed for four hours and the solvent is evaporated off in vacuo to give 5-bromo-1,4,6-trimethylisatin, M.P. 209–211° C.

5-bromo-1,4,6-trimethylisatin is reacted with thiosemicarbazide by the procedure of Example 2 to give 8-bromo - 3 - mercapto-5,7,9-trimethyl-5H-as-triazino[5,6-b]indole, M.P. >320° C.

8 - bromo - 3 - mercapto-5,7,9-trimethyl-5H-as-triazino [5,6-b]indole is treated with hydrogen peroxide and sodium hydroxide by the procedure of Example 3 to give 8 - bromo - 3 - hydroxy-5,7,9-trimethyl - 5H - as - triazino [5,6-b]indole, M.P. 304–310° C. This intermediate is treated with phosphorus oxychloride and dimethylaniline by the procedure of Example 3 to give 8-bromo-3-chloro-5,7,9-trimethyl - 5H - as-triazino[5,6-b]indole. This intermediate is heated with 4-amino-2-methyl-2-butanol in toluene for six hours and worked up by the procedure of Example 3 to give 4-[(8-amino-5,7,9-trimethyl - 5H - as-triazino[5,6-b]indol-3-yl)amino]-2-methyl-2-butanol.

Example 44

6-trifluoromethylisatin is treated with dimethyl sulfate and thallous ethoxide in dimethylformamide and the resulting N-methyl-6-trifluoromethylisatin is treated with thiosemicarbazide and aqueous potassium carbonate by the procedure described in Example 2 to give 3-mercapto-5-methyl-7-trifluoromethyl-5H-as-triazino[5,6-b]indole.

The above prepared 3-mercapto compound is treated with methyl iodide and sodium hydroxide by the procedure of Example 4 to give 5-methyl-3-methylthio-7-trifluoromethyl-5H-as-triazino[5,6-b]indole. This intermediate is nitrated by the procedure of Example 4 to give 5-methyl - 3 - methylthio-8-nitro - 7 - trifluoromethyl-5H-as-triazino[5,6-b]indole. Reducing the 8-nitro group with hydrazine and 10% palladium on charcoal by the procedure of Example 4 gives 8-amino-5-methyl-3-methylthio-7-trifluoromethyl-5H-as-triazino[5,6-b]indole.

The above prepared intermediate is reacted with 4-amino-2-methyl-2-butanol by the procedure of Example 4 to give 4-[(8-amino-5-methyl-7-trifluoromethyl-5H-as-triazino[5,6-b]indol-3-yl)amino]-2-methyl-2-butanol.

Example 45

By the procedure of Example 4 using 6-ethylisatin in place of 4-methylisatin, the product is 4-[(8-amino-7-ethyl - 5 - methyl-5H-as-triazino[5,6-b]indol-3-yl)amino]-2-methyl-2-butanol.

Example 46

By the procedure of Example 2 using m-isopropylaniline in place of 3,5-dimethylaniline, 6-isopropylisatin and 4-isopropylisatin are obtained.

By the procedure of Example 4 using 6-isopropylisatin in place of 4-methylisatin, the product is 4-[(8-amino-7-isopropyl - 5 - methyl-5H-as-triazino[5,6-b]indol - 3 - yl) amino]-2-methyl-2-butanol.

By the same procedure using 4-isopropylisatin, the product is 4-[(8-amino-9-isopropyl - 5 - methyl-5H-as-triazino[5,6-b]indol-3-yl)amino]-2-methyl-2-butanol.

Example 47

3-chloro-4-methylaniline is converted by the procedure described in Example 2 to 4-chloro-5-methylisatin and 6-chloro-5-methylisatin.

4-chloro-5-methylisatin is treated by the procedure of Example 3 to give 4-[(9-chloro-5,8-dimethyl-5H-as-triazino[5,6-b]indol-3-yl)amino]-2-methyl-2-butanol.

The above prepared 9-chloro compound (1.0 g.) is heated with liquid ammonia, cuprous chloride and copper in a bomb at 110° C. for eight hours to give, after passing the reaction mixture through a dry column of alumina and concentrating the eluate, 4-[(9-amino-5,8-dimethyl-5H-as-triazino[5,6-b]indol-3-yl)amino] - 2 - methyl-2-butanol.

Example 48 m-Ethylaniline is reacted according to the procedure of Example 2 to give 4-ethylisatin and 6-ethylisatin.

Using 4-ethylisatin in place of 4-methylisatin in the procedure of Example 4, the product is 4-[(8-amino-9-ethyl-5-methyl-5H-as-triazino[5,6-b]indol - 3 - yl)amino]-2-methyl-2-butanol.

Example 49

4 - [(9 - chloro - 5 - methyl - 5H - as - triazino[5,6 - b]indol-3-yl)amino]-2-methyl-2-butanol, prepared by reacting 9-chloro-5-methyl-3-methylthio-5H-as-triazino[5,6-b]indole with 4-amino-2-methyl-2-butanol by the procedure of Example 10, is heated with liquid ammonia, cuprous chloride and copper in a bomb at 110° C. for eight hours to give, after passing the reaction mixture through a dry column of alumina and concentrating the eluate, 4-[(9-amino - 5 - methyl - 5H - as - triazino[5,6 - b]indol - 3 - yl) amino]-2-methyl-2-butanol.

A mixture of 1.0 g. of 4-[(9-amino-5-methyl-5H-as-triazino[5,6-b]indol-3-yl)amino]-2-methyl-2-butanol, 2.0 g. of N-chlorosuccinimide and 30 ml. of carbon tetrachloride is heated at 76° C. for five hours to give, after concentrating in vacuo, 4-[(9-amino-8-chloro-5-methyl-5H-as-triazino[5,6-b]indol-3-yl)amino]-2-methyl-2-butanol.

Example 50

9 - chloro - 5 - methyl - 3 - methylthio - 8 - nitro- 5H-as-triazino[5,6-b]indole, prepared as in Example 10, is heated with ammonia, cuprous chloride and copper in a bomb by the procedure of Example 49 to give 9-amino-5-methyl - 3 - methylthio - 8 - nitro - 5H - as - triazino [5,6-b]indole. Reacting this intermediate with 4-amino-2-methyl-2-butanol by the procedure of Example 10 gives 4-[(9 - amino - 5 - methyl - 8 - nitro - 5H - as - triazino [5,6-b]indol-3-yl)amino]-2-methyl-2-butanol.

Reducing the 8-nitro group using hydrazine and palladium on charcoal gives 4-[(8,9-diamino-5-methyl-5H-as-triazinol[5,6-b]indol-3-yl)amino]-2-methyl-2-butanol.

Example 51

6-carboxyisatin is N-methylated by stirring with methanolic potassium hydroxide and dimethyl sulfate to give 6-carboxy-N-methylisatin.

6-carboxy-N-methylisatin is converted according to the procedure described in Example 2 to 7-carboxy-5-methyl-3-methylthio-5H-as-triazino[5,6-b]indole. Nitrating this intermediate by the procedure of Example 4, then refluxing the resulting 7-carboxy-5-methyl-3-methylthio-8-nitro-5H-as-triazino[5,6-b]indole in ethanol with hydrazine and palladium on charcoal, and then reacting the resulting 8-amino - 7 - carboxy - 5 - methyl - 3 - methylthio - 5H - as-triazino[5,6-b]indole with 4 - amino-5-methyl-2-butanol gives 4 - [(8-amino-7-carboxy-5-methyl-5H-as-triazino[5,6-b]indol-3-yl)amino]-2-methyl-2-butanol.

A mixtureof 4-[(8-amino-7-carboxy-5-methyl-5H-as-triazino[5,6-b]indol-3-yl)amino]-2-methyl-2-butanol, diazomethane and dimethylformamide is allowed to stand at room temperature for 24 hours to give, after concentrating in vacuo, 4-[(8-amino-7-carbomethoxy-5-methyl-5H-as-triazino[5,6-b]indol-3-yl)amino]-2-methyl-2-butanol.

Example 52

6-bromo-N-methylisatin, prepared from 3-bromoaniline by the procedure of Example 2, is reacted with thiosemicarbazide and aqueous potassium carbonate and the resulting 7 - bromo-3-mercapto-5-methyl-5H-as-triazino[5,6-b] indole is treated with methyl iodide and sodium hydroxide by the procedure of Example 2 to give 7-bromo-5-methyl-3-methylthio-5H-as-triazino[5,6-b]indole. This intermediate is nitrated by the procedure described in Example 4 and the resulting 7-bromo-5-methyl-3-methylthio-8-nitro-5H-as-triazino[5,6-b]indole is heated with cuprous cyanide and dimethylformamide to give 7-cyano-5-methyl-3-methylthio-8-nitro-5H-as-triazino[5,6-b]indole.

7 - cyano - 5 - methyl - 3 - methylthio - 8 - nitro- 5H-as-triazino[5,6-b]indole is reacted with 4-amino-2-methyl-2-butanol to give 4-[(7-cyano-5-methyl-8-nitro-5H-as-triazino[5,6-b]indol-3-yl)amino]-2-methyl-2-butanol. The 8-nitro group is reduced using hydrazine and palladium on charcoal in ethanol to give 4-[(8-amino-7-cyano-5-methyl-5H - as - triazino[5,6 - b]indol - 3 - yl)amino] - 2 - methyl-2-butanol.

Example 53

A mixture of 3-chloro-7-methoxy-5-methyl-8-nitro-5H-as-triazino[5,6-b]indole, prepared as in Example 8, and 3-aminopropanol is heated at 170° C. for 20 hours. The reaction mixture is triturated with water and filtered to give 3 - [(7 - methoxy - 5 - methyl - 8 - nitro - 5H - as - triazino[5,6-b]indol-3-yl)amino]propanol.

Reducing the 8-nitro group using hydrazine and 10% palladium on charcoal gives 3-[(8-amino-7-methoxy-5-methyl-5H-as-triazino[5,6-b]indol-3-yl)amino]propanol.

By the same procedure using 6-aminohexanol in place of 3-aminopropanol, 6-[(7-methoxy-5-methyl-8-nitro-5H-as-triazino[5,6-b]indol-3-yl)amino]hexanol is obtained. Reducing the nitro group gives 6-[(8-amino-5-methyl-7-methoxy-5H-as-triazino[5,6-b]indol-3-yl)amino]hexanol.

Example 54

5,7 - dimethyl - 3 - methylthio - 8-nitro - 5H - as-triazino[5,6-b]indol, prepared as in Example 5, is reacted with 3-aminopropanol by the procedure of Example 53 to give 3-[(5,7-dimethyl-8-nitro-5H-as-triazino[5,6-b]indol-3-yl)amino]propanol.

Treating 3-[(5,7-dimethyl-8-nitro-5H-as-triazino[5,6-b] indol-3-yl)amino]propanol with hydrazine and 10% palladium on charcoal gives 3-[(8-amino-5,7-dimethyl-5H-as-triazino[5,6-b]indol-3-yl)amino]propanol.

By the same procedure using 3-amino-1,2-propanediol in place of 3-aminopropanol, 3-[(5,7-dimethyl-8-nitro-5H-as-triazino[5,6-b]indol-3-yl)amino] - 1,2 - propanediol is obtained. Reducing the nitro group gives 3-[(8-amino-5,7-dimethyl-5H-as - triazino[5,6 - b]indol-3-yl)amino] - 1,2-propanediol.

Example 55

5,9 - dimethyl - 3 - methylthio - 8 - nitro - 5H - as-triazino[5,6-b]indole, prepared as in Example 4, is reacted with 3-aminopropanol by the procedure of Example 53 to give 3-[(5,9-dimethyl-8-nitro-5H-as-triazino[5,6-b] indol - 3 - yl)amino]propanol. Reducing the nitro group using hydrazine and 10% palladium on charcoal gives 3 - [(8 - amino-5,9-dimethyl-5H-as-triazino[5,6-b]indol-3-yl)amino]propanol.

Example 56

9 - bromo - 8 - hydroxy-5-methyl-3-methylthio-5H-as-triazino[5,6-b]indole, prepared as in Example 23, is reacted with 3-aminopropanol by the procedure of Example 53 to give 3 - [(9 - bromo - 8-hydroxy-5-methyl-5H-as-triazino[5,6-b]indol-3-yl)amino]propanol.

Reacting 9 - bromo - 8 - hydroxy-5-methyl-5H-as-triazino[5,6-b]indole with 4-amino-2-butanol gives 4-[(9-bromo - 8 - hydroxy-5-methyl-5H-as-triazino[5,6-b]indol-3-yl)amino]-2-butanol.

Example 57

5,7,9 - trimethyl - 3 - methylthio-8-nitro-5H-as-triazino [5,6-b]indole, prepared as in Example 41, is reacted with 3-aminopropanol by the procedure of Example 53 to give 3 - [(5,7,9 - trimethyl-8-nitro-5H-as-triazino[5,6-b]indol-3-yl)amino]propanol.

3 - [(5,7,9 - trimethyl - 8 - nitro - 5H - as - triazino [5,6-b]indol-3-yl)amino]propanol is treated with hydrazine and 10% palladium on charcoal to give 3-[(8-amino-5,7,9 - trimethyl - 5H - as - triazino[5,6-b]indol-3-yl) amino]propanol.

By the same procedure using 3-amino-1,2-propanediol in place of 3-aminopropanol, 3-[(5,7,9-trimethyl-8-nitro-5H-as-triazino[5,6-b]indol-3-yl)amino]-1,2-propanediol is obtained. Reducing the nitro group gives 3-[(8-amino-5,7,9 - trimethyl - 5H - as - triazino[5,6 - b]indol - 3-yl) amino]-1,2-propanediol.

Example 58

4 - [(8 - amino - 7 - chloro - 5 - methyl - 5H - as-triazino[5,6-b]indol-3-yl)amino]-2-methyl-2-butanol, prepared as in Example 9, is dissolved in ethanol and the solution is treated with concentrated sulfuric acid in acetone (1:4) until it is acidic. Diluting with several volumes of ether and then filtering gives the disulfate salt of 4-[(8-amino - 7 - chloro - 5 - methyl - 5H - as - triazino[5,6-b] indol - 3 - yl)amino] - 2 - methyl - 2 - butanol.

What is claimed is:

1. A compound of the formula:

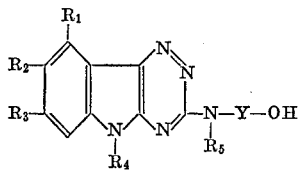

in which:

$R_1$, $R_2$ and $R_3$ are hydrogen, halogen, lower alkyl, lower alkoxy, hydroxy, nitro, amino, lower alkylamino, di-lower alkylamino, lower alkanoylamino, trifluoromethyl, lower alkylthio, mercapto, lower alkylsulfonyl, lower alkanoyl, cyano, carboxy, lower alkoxycarbonyl, carbamoyl or amidino or, when $R_1$ is hydrogen, $R_2$ and $R_3$ taken together may be methylenedioxy, at least two of $R_1$, $R_2$ and $R_3$ being other than hydrogen;

$R_4$ is hydrogen, lower alkyl, benzyl or phenethyl;

$R_5$ is hydrogen or methyl and

Y is branched or straight chain alkylene of 2–10 carbon atoms, or a pharmaceutically acceptable, acid addition salt thereof, said lower alkyl, lower alkoxy and lower alkanoyl groups having 1–4 carbon atoms.

2. A compound according to claim 1 in which $R_1$ and $R_3$ are hydrogen, halogen, methyl, ethyl, methoxy, ethoxy or hydroxy, at least one of $R_1$ and $R_3$ being other than hydrogen; $R_2$ is lower alkyl, lower alkoxy, hydroxy, amino, lower alkylamino or di-lower alkylamino; $R_4$ is methyl or ethyl; $R_5$ is hydrogen and Y is

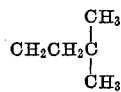

3. A compound according to claim 1 in which $R_1$ is hydrogen, $R_2$ is amino, $R_3$ is chloro, $R_4$ is methyl, $R_5$ is hydrogen and Y is

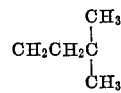

4. A compound according to claim 1 in which $R_1$ is chloro, $R_2$ is amino, $R_3$ is hydrogen, $R_4$ is methyl, $R_5$ is hydrogen and Y is

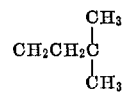

5. A compound according to claim 1 in which $R_1$ is methyl, $R_2$ is hydrogen, $R_3$ and $R_4$ are methyl, $R_5$ is hydrogen and Y is

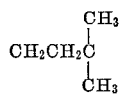

6. A compound according to claim 1 in which $R_1$ is hydrogen, $R_2$ and $R_3$ are methoxy, $R_4$ is methyl, $R_5$ is hydrogen and Y is

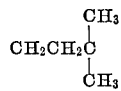

7. A compound according to claim 1 in which $R_1$ is hydrogen, $R_2$ is methoxy, $R_3$ is chloro, $R_4$ is methyl, $R_5$ is hydrogen and Y is

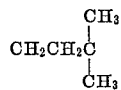

8. A compound according to claim 1 in which $R_1$ is hydrogen, $R_2$ is amino, $R_3$ is methoxy, $R_4$ is methyl, $R_5$ is hydrogen and Y is

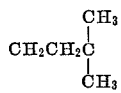

9. A compound according to claim 1 in which $R_1$ is hydrogen, $R_2$ is amino, $R_3$ and $R_4$ are methyl, $R_5$ is hydrogen and Y is

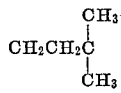

10. A compound according to claim 1 in which $R_1$ is bromo, $R_2$ is hydroxy, $R_3$ is hydrogen, $R_4$ is methyl, $R_5$ is hydrogen and Y is

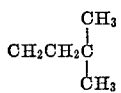

References Cited
UNITED STATES PATENTS 3,466,281　9/1969　Gladych et al. _____ 260—249.9
3,452,013　6/1969　Gladych et al. _____ 260—249.9

JOHN M. FORD, Primary Examiner

U.S. Cl. X.R.

260—249.5, 325; 424—249